United States Patent Office 3,515,569
Patented June 2, 1970

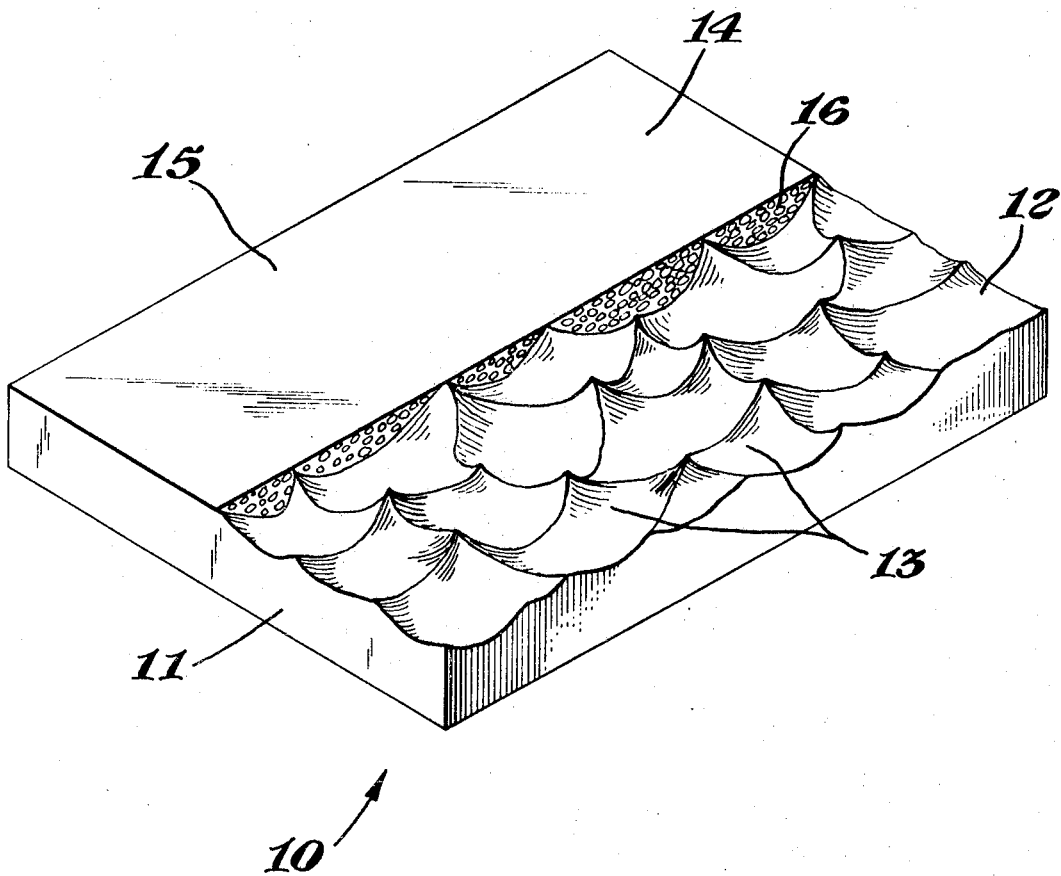

3,515,569
METHOD OF PREPARING SMOOTH SURFACED ARTICLES AND ARTICLES PROVIDED BY THE METHOD
Harold A. Walters, Beaverton, and Donald S. Morehouse, Midland, Mich., assignors to The Dow Chemical Company, Midland, Mich., a corporation of Delaware
Filed Nov. 21, 1966, Ser. No. 595,843
Int. Cl. B44d 1/94, 1/26
U.S. Cl. 117—21                                                18 Claims

ABSTRACT OF THE DISCLOSURE

Expandable or unexpanded microspheres are applied to a rough surface such as paper and formed by heat to provide a light weight, smooth surfaced substrate.

---

This invention relates to a method of providing smooth surfaced articles and to articles prepared by such a method, and more particularly relates to an improved method and article wherein relatively small surface depressions are filled with material of minimal weight.

In many instances, it is desirable to coat an article or surface in such a manner that minor and oftentimes major irregularities are filled to provide a relatively smooth exposed surface. Such filling may be accomplished by a wide variety of means. Such filling techniques or smoothing techniques oftentimes involve abrading the surface in such a manner that a smooth surface remains, calendering, crushing or mechanically deforming the surface until it is relatively uniform. Oftentimes, such filling is accomplished by employing a resinous binder and a particular filler such as is frequently employed in primary coat for wood wherein the materials such as calcium carbonate, diatomaceous earth, or other fillers are disposed within a suitable vehicle which is applied to the surface to fill undesired voids. Oftentimes, such filling techniques suffer from significant disadvantages in that they require a relatively long period of time for the application. Some require a plurality of coats; others require loss of material and densification of a product. Frequently, it is desirable to have a product of minimum bulk density and yet provide a smooth and relatively continuous surface. Oftentimes, it is also desirable in applying such a coating to fill the void spaces in or on the surface of an article, that a minimum amount of coating composition be applied and that the coating composition be of minimum weight.

It would be desirable if there were available an improved coating method which would provide a smooth surfaced article utilizing a material of minimum weight.

It would also be advantageous if there were available a method of filling surface voids employing a minimum quantity of coating material.

It would also be advantageous if there were available a method of filling surface voids within articles which was rapid and required a relatively small amount of equipment.

It would also be advantageous if there were available an improved coated article having a smooth surface.

These benefits and other advantages in accordance with the method of the present invention are achieved in the coating of an article having a surface, the surface of the article having a visually perceptible roughness, the method comprising applying to a rough surface of an article a quantity of synthetic resinous thermoplastic particles having a diameter of from about 1 to about 100 microns, adhering the particles to the surface of the article, subsequently forming the particles and adhering the particles to the surface to provide an article having a visually smooth surface.

Also contemplated within the scope of the present invention is an article having at least one surface, the surface of the article defining a plurality of depressions, the depressions of the article being filled with a plurality of hollow synthetic resinous thermoplastic microspheres, the microspheres being adhered to the surface of the article and to each other thereby providing a visually smooth surface.

Further features and advantages of the present invention will become more apparent from the following specification taken in connection with the drawing wherein:

The figure schematically depicts an article prepared in accordance with the invention.

In the figure, there is depicted an article generally designated by the reference numeral 10. The article 10 comprises a body 11 having a first or rough surface 12. The rough surface 12 defines a plurality of depressions 13. A coating 14 is disposed on a portion of the surface 12. The coating 14 and the body 11 define a visually smooth surface 15. The coating 14 comprises a plurality of hollow synthetic resinous microspheres 16 adhered to the surface 12 of the body 11 and presenting the visually smooth surface 15.

Microspheres which are suitable for use in the practice of the method of the present invention are described in Belgian Pat. 641,711 wherein microspheres which comprise an external wall of a thermoplastic synthetic resinous material and a generally centrally disposed inclusion of a volatile liquid foaming agent are described. Preferably, the microspheres have an unexpanded diameter of from about 2 to about 20 microns. Belgian Pat. 641,711 also describes blown or expanded synthetic resinous thermoplasitc microspheres which comprise thin walled spherical particles having dispersed therein a generally symmetrical void filled with gas. Expanded thermoplastic microspheres are disclosed in U.S. Pat. 2,797,201, preferably having expanded diameters from about 5 to about 100 microns.

In the practice of the method of the present invention, microspheres of the expanded or unexpanded variety are applied to a rough surface having a plurality of voids therein in a quantity approximately sufficient to fill the voids and subsequently the microspheres are thermoformed by contact with a surface of the desired smoothness to provide the desired surface finish. Such contact with a heated surface beneficially may be provided by polished chromium plated rolls, etched rolls or polished plates in a platen press and like means for forming thermoplastic surfaces which are well known to those skilled in the art.

Beneficially, the microspheres employed in preparing coatings may be applied to a surface or substrate in accordance with the method of the invention in a variety of manners. The unexpanded microspheres described in Belgian Pat. 641,711 together with the binders described therein such as synthetic latexes and the like which are employed to apply a coating of unfoamed or unexpanded microspheres and binder to a substrate such as paper, fabric or the like. A top or overcoat may be applied thereto such as a clay coating having a suitable binder therein. The coating on the substrate is then dried and contacted with a surface of a desired configuration to heat the coating to a sufficient extent to cause the unexpanded microspheres to heat-plastify and expand, thereby providing a relatively highly polished surface.

Alternatively, the unfoamed microspheres together with suitable binders are applied in a predetermined quantity to the surface of the substrate, the coating dried and foamed in contact with a suitable surface such as a polished metal surface, sand blasted surface, or a surface of desired intermediate roughness, and subsequently a top coat applied. If desired, the addition of the top coat may be omitted if the foamed surface of the microspheres has the desired properties and appearance.

Alternatively, unfoamed microspheres may be electrostatically applied to a substrate such as paper and the dry coating of expandable microspheres contacted with a surface of desired smoothness and the unfoamed microspheres expanded and bonded together under the influence of heat and pressure to provide a desired surface finish.

Alternatively, a coating composition is prepared employing expanded or foamed miscrospheres with a binder, the coating dried and the resultant surface contacted with a heated configuration such as a hot polished chromium plated roll or a flat surface to provide a uniform and smooth surface on the article. Electrostatic spraying of dry foamed microspheres is also readily used to provide a light fluffy surface coating which is subsequently deformed by the influence of heat and pressure to provide a surface of the desired uniformity.

Beneficially, the method of the present invention can be applied to a wide variety of substrates which include those of a fibrous nature as well as a nonfibrous nature. Such substrates include paper of both natural fiber and synthetic fiber, fabrics of the woven and non-woven variety of inorganic, natural or synthetic fiber, wood, synthetic resinous foams, board such as fiberboard of the untempered variety, cement, asbestos, wet roving and the like.

Generally, in the practice of the present invention and in the preparation of the articles in accordance with the invention, it is highly desirable that the weight of coating applied to the substrate be sufficient to fill the voids within the surface and provide a generally uniform coating that does not add significantly to the thickness of the substrate. This is of particular significance when relatively thin substrates such as paper are to be coated and is also of great significance when relatively large areas are to be coated. For example, if a synthetic resinous foam structure such as a building is to be overcoated, it is highly desirable that the amount of coating material required to provide a smooth surface be known in advance. Thus, a single batch of coating material may be prepared which will accomplish the desired end without wasteful overage or shortage.

Beneficially, the weight of coating to be applied over substrate is readily determined by determining the surface void volume. The surface void volume is easily determined by coating a test portion of the substrate with a viscous liquid solution of known density and determining the weight per unit area of the viscous solution required. Usually, for most substrates which are relatively porous, a solution having a viscosity of from about 1 to 10,000 centipoise is convenient. Such a coating is readily applied to the test surface using a smooth metal rod as a metering or doctoring device.

Alternatively, such a volume is readily determined by coating a predetermined area or applying a predetermined quantity of the coating material to a substrate and determinating the area which is covered. In treating articles which have a rough surface but are non-absorbing, the volume per unit area may be readily determined by employing a less viscous liquid such as water or water containing a minor quantity of detergent. Once the void volume has been determined, the expanded volume per unit weight of any particular coating composition is readily determined by applying a coating to a surface, foaming if the coating is of the foam variety, or permitting to dry if the coating is of a non-foaming variety, measuring the thickness of the coating in the area and the weight of the dry coating to provide the volume per unit weight of the microsphere coating.

Often, in determining the volume per unit weight of coating, it is desirable that polishing of the coating be done when the microspheres are in the expanded state and preferably after the coating is compressed under conditions which will be similar to those employed to polish the surface of the completed article.

Thus, knowing the volume to be filled, the appropriate coating weight of dry components is readily applied to the substrate. This may be achieved by dilution of the microsphere containing coating material or by the application of multiple coats depending on the roughness of the substrate.

The invention is further illustrated but not limited by the following examples.

EXAMPLE 1

A coating formulation is prepared employing an aqueous slurry of expandable polymethyl methacrylate microspheres having an unexpanded diameter of about 5 microns and prepared in the manner described in Belgian Pat. No. 641,711. Wet microspheres are employed which are 77.4 weight percent microspheres and the microspheres contain 35 weight percent neopentane based on the combined weight of the neopentane and polymethyl methacrylate. 259 parts by weight of the wet polymethyl methacrylate microspheres are admixed with 10 parts by weight of 25 weight percent sodium dodecyl diphenyloxide disulfonate, 1017 parts by weight water and 250 parts by weight of a 5 weight percent solution of the sodium salt of polyacrylic acid. A 51 pound base stock paper is evaluated for void space by coating one surface thereof with an aqueous solution of a hydroxy propylene methyl cellulose containing 2.5 percent by weight of the cellulose derivative. The solution has a viscosity of about 5,000 centipoise. The cellulose derivative solution is applied to the surface of the paper employing a smooth metal rod. The cellulose coated paper was immediately weighed after coating and picked up 1.3 grams per square foot of the coating. The heat-expandable polymethyl methacrylate coating composition indicates that 0.288 gram of unfoamed microspheres are sufficient to fill a cubic centimeter of a void space. A coating of 2.75 grams of the microsphere coating formulation is applied per square foot to the paper base stock and air dried at a temperature of about 50° C. The dried coated sheet is placed between two polished chromium plated panels, the panels treated with a commercially-available siloxane mold release agent and the composite is compressed in a platen press at a pressure of 635 pounds per square inch for a period of 30 seconds. The platens of the press are heated to a temperature of 150° C. The coated sheet is then removed from the press and the chromium plated surfaces and cooled to about 30° C. A flat uniform surface suitable for printing or recoating is obtained. No obvious surface defects are noted by the naked eye and the thickness of the paper is not reduced.

EXAMPLE 2

An expandable microsphere coating composition is prepared employing polymethyl methacrylate-neopentane microspheres as employed in Example 1. The microspheres are in the form of a water wet cake containing 75 weight percent microspheres. 94 parts by weight of the microsphere slurry is admixed with 100 parts of water and 40 parts by weight of a latex which is a copolymer of 60 weight percent styrene, 40 weight percent butadiene and 50 weight percent latex solids, 78.3 parts by weight of a 5 weight percent aqueous solution of sodium salt of polyarcrylic acid. A 10 ounce jute burlap substrate employing the procedure of Example 1 is determined to have a void volume of 23 cubic centimeters per square foot which requires 23.2 grams of the coating formulation. The coating formulation containing the expandable microspheres is applied to the jute by a smooth rod. The coating formulation is dry. The jute is treated in the manner of the paper base sheet of Example 1 and a smooth uniform coating is formed on one surface thereof. No significant voids or defects are visibly discernible.

EXAMPLE 3

A coating composition is prepared employing a wet cake of expandable microspheres. The cake is 75 weight percent microspheres and 25 weight percent water. The expandable microsphere polymer shell is 80 weight percent vinylidene chloride and 20 weight percent acrylonitrile. The microspheres contain 35 weight percent neopentane based on the combined weight of the polymer shell and neopentane. The coating formulation contains 40 parts by weight of a latex prepared by the copolymerization of 60 weight percent styrene and 40 weight percent butadiene. The styrene-butadiene latex is 50 weight percent solids, 78.3 weight percent of a 5 weight percent aqueous solution of sodium salt of polyacrylic acid. A 7.5 ounce woven glass fabric is evaluated for a void volume by the method set forth in Example 1 and is found to have a void volume of 18.45 cubic centimeters per square foot. Evaluation of the coating formulation indicates that 16.55 grams per square foot is sufficient to fill the voids. A coating of 16.6 grams of the formulation is applied to the glass fabric which is subsequently treated in the manner of the base sheet of Example 1. No visible surface defects or voids are observed.

EXAMPLE 4

A foamable coating composition is prepared from a wet expandable microsphere cake which is 75 weight percent microspheres. The expandable microspheres have a polymer shell prepared from 60 weight percent styrene and 40 weight percent acrylonitrile and contain 35 weight percent neopentane based on the combined weight of the polymer shell and the neopentane. 90 parts by weight of the microsphere slurry are admixed with 158.3 parts by weight of water and 60.4 parts by weight of a 50 weight percent latex solids of 85 weight percent vinylidene chloride, 10 weight percent butyl acrylate and 5 weight percent acrylonitrile. 10 parts by weight of a 10 weight percent hydroxy ethyl cellulose is admixed as a thickener for the coating composition. Employing the procedure of Example 1, the void volume of a surface of a birch veneer is determined to be 6.4 cubic centimeters per square foot which requires about 6 grams of the coating composition. The birch veneer is coated with about 6 grams per square foot of the coating composition and subsequently heated in a platen press with the dry coated surface in contact with the chromium plated sheet. A smooth continuous surface is formed with no visible defects.

EXAMPLE 5

A coating composition is prepared which comprises 94 parts by weight of a wet cake of expandable microspheres. The cake is 75 percent microspheres. The expandable microspheres have a polymer shell of 80 weight percent methyl methacrylate and 20 weight percent methyl acrylate. The microspheres contain 35 weight percent neopentane based on the total weight of the neopentane in the polymer shell, 100 parts by weight of water, 40 parts by weight of a 50 percent solids latex prepared by the polymerization of 60 weight percent styrene and 40 weight percent butadiene, and 78.3 parts by weight of a 5 weight percent solution of the sodium salt of polyacrylic acid. A woven glass roving having a weight of 18.5 ounces per square yard is determined by the procedure of Example 1 to have a void volume of 18.24 cubic centimeters per square foot. 17.2 grams per square foot of the formulation are applied to the glass roving, the water removed from the coating at a temperature of about 50° C. and the coated fabric heated between chromium plated sheets in the manner set forth in Example 1. A smooth continuous coating is obtained which is free from any obvious surface defects.

EXAMPLE 6

A coating composition is prepared employing 94 parts by weight of a wet cake of expandable microspheres. The cake is 75 weight percent microspheres. The microsphere polymer shell is polymethyl methacrylate which contains 35 weight percent neopentane based on the combined weight of the neopentane and methyl methacrylate, 100 parts by weight of water, 40 parts by weight of a 50 percent solids latex prepared by the polymerization of 60 weight percent styrene and 40 weight percent butadiene, and 78.3 parts by weight of a 5 weight percent aqueous solution of the sodium salt of polyacrylic acid. A 20 mil uncalendered paperboard prepared by Fourdrinier employing the procedure of Example 1 is determined to have a surface void volume of about 3 cubic centimeters per square foot. Application of 2.845 grams of the coating composition, subsequent drying and foaming provide a product having a smooth surface without visible defects.

EXAMPLE 7

A coating composition is prepared employing 94 parts by weight of a wet cake of expandable microspheres. The cake is 75 weight percent microspheres. The polymer shell of the microsphere is 80 weight percent methyl methacrylate and 20 weight percent methyl acrylate. The spheres contain 35 weight percent neopentane based on the combined weight of the polymer and the neopentane, 100 parts by weight of water, 40 parts by weight of a 50 percent solids latex prepared by the polymerization of 60 weight percent styrene and 40 weight percent butadiene, and 78.3 percent by weight of a 5 weight percent solution of sodium salt of polyacrylic acid. The surface void volume of a 10 ounce per square yard of canvas duck is determined to be 12.86 cubic centimeters per square foot employing the procedure of Example 1. A coating of 12.29 grams of the coating composition (per square foot) is applied thereto and subsequently dried. The dried coated canvas is treated in accordance with the procedure of Example 1 and a smooth uniform surface with no visible defects is obtained.

EXAMPLE 8

A coating composition is prepared from 90 parts by weight of a wet expandable microsphere cake. The cake contains 75 weight percent microspheres. The polymer shell of the microspheres is a copolymer of 60 weight percent styrene and 40 weight percent acrylonitrile. The microspheres contain 35 weight percent neopentane based on the combined weight of the polymer and the neopentane, 158.3 parts by weight of water, 60.4 parts by weight of a 50 percent solids latex of a copolymer of 85 weight percent vinylidene chloride, 10 weight percent butyl acrylate and 5 weight percent acrylonitrile and 10 parts by weight of a 10 weight percent aqueous solution of hydroxy ethyl cellulose. The rough surface of a No. 1 Whatman filter paper is determined to have a void volume on the rough surface thereof of 4.36 cubic centimeters per square foot employing the procedure of Example 1. The filter paper is coated with the coating composition at a coating weight of about 6.3 grams per square foot and subsequently dried, then foamed in a platen press in the manner of Example 1. A smooth continuous surface with no visible defects results.

EXAMPLE 9

A coating composition is prepared employing 94 parts by weight of a wet cake of expandable microspheres containing 75 weight percent microspheres. The expandable microspheres have a polymer shell of polymethyl methacrylate and contain 35 weight percent neopentane based on the combined weight of the neopentane and the methyl methacrylate, 100 parts by weight of water, 40 parts by weight of a 50 percent solids latex prepared by the polymerization of 60 weight percent styrene and 40 weight percent butadiene, and 78.3 parts by weight of a 5 weight percent aqueous solution of the sodium salt of polyacrylic acid. A No. 80 (U.S. Sieve Size) wire mesh screen is found to have a void volume of 12.94 cubic centimeters per square foot employing the procedure described in Example 1. The coating composition is applied at a coating weight of 12.2 grams per square foot, dried and treated between chromium plated sheets in accordance with Example 1. The resultant coating is uniform and shows no visible defects.

EXAMPLE 10

A coating composition is prepared employing 106.6 parts by weight of a wet cake of expandable microspheres. The cake is 75 weight percent microspheres. The microspheres have a polymer shell of 80 weight percent vinylidene chloride and 20 weight percent acrylonitrile and contain 35 weight percent neopentane based on the combined weight of the neopentane and polymer, 158.3 parts by weight of water, 60.4 parts by weight of a 50 percent solids latex polymerized from 85 weight percent vinylidene chloride, 10 weight percent butyl acrylate and 5 weight percent acrylonitrile and 10 parts by weight of a 10 weight percent aqueous solution of hydroxy ethyl cellulose. A cement asbestos board is determined to have a void volume of 4.2 cubic centimeters per square foot employing the procedure of Example 1. A coating of the microsphere composition is applied to a cement asbestos board at a coating weight of about 5.7 grams per square foot, the coating dried and subsequently foamed employing the procedure of Example 1. A smooth surface is obtained with no indication of surface defects.

EXAMPLE 11

A coating composition is prepared employing 203 parts by weight of a 49.3 weight percent solids latex prepared by the polymerization of 60 weight percent styrene and 40 weight percent butadiene, 4 parts by weight of a 25 weight percent aqueous dispersion of a nonyl phenol ethylene oxide adduct commercialy available under the trade designation of Dowfax 919, 196 parts by weight water, 51.2 parts by weight of an aqueous slurry of foamed methyl methacrylate microspheres containing 7.74 weight percent microspheres. The 51 pound base stock paper of Example 1 is coated with a coating weight of 2.18 grams per square foot of the coating composition by means of a rod wound with No. 16 wire. The coated paper is dried and subsequently pressed in a platen press in the manner of Example 1. A smooth uniform coating is obtained with no visible defects.

EXAMPLE 12

A coating composition is prepared employing 214 parts by weight of an aqueous slurry of expanded or foamed microspheres. The foamed microspheres are a copolymer of 80 weight percent methyl methacrylate and 20 weight percent methyl acrylate. The slurry contains 8 weight percent solids, 4 parts by weight of a 25 weight percent aqueous solution of a nonyl phenol ethylene oxide adduct commercially available under the trade designation of Dowfax 9N9, 203 parts by weight of water, 203 parts by weight of a 49.3 weight percent latex of a polymer of 60 weight percent styrene and 40 weight percent butadiene and 51.2 parts by weight of a 5 weight percent aqueous solution of the sodium salt of polyacrylic acid. An 18.5 ounce woven glass roving is determined to have a void volume of 18.2 cubic centimeters per square foot. 29.4 grams of the coating formulation per square foot is applied to the glass roving to give a dry coating rate, the coating dried and subsequently polished in a heated press in the manner of Example 1. A smooth continuous coating is obtained with no visible defects.

EXAMPLE 13

A coating composition is prepared employing 203 parts by weight of a 49.3 weight percent solids latex prepared by the polymerization of 60 weight percent styrene and 40 weight percent butadiene, 4 parts by weight of a 25 weight percent aqueous solution of a nonyl phenol ethylene oxide adduct commercially available under the trade designation of Dowfax 9N9, 196 parts by weight of water, 221 parts by weight of an aqueous dispersion of expanded polymethyl methacrylate microspheres (77.4 weight percent polymethyl methacrylate) and 51.2 parts by weight of a 5 weight percent aqueous solution of the sodium salt of polyacrylic acid. A sample of 10 ounce burlap is found to have a void surface volume of 23.24 cubic centimeters per square foot employing the procedure of Example 1. A coating of 37.5 grams per square foot of the coating composition is applied to the burlap, the coating dried and polished in a platen press in accordance with Example 1. A smooth continuous surface is obtained which exhibits no visual defects.

EXAMPLE 14

A coating composition is prepared employing 142.9 parts by weight of an American Society for Paper Makers 600 clay dispersion, 70 weight percent water together with 29.2 parts by weight of a 51.5 weight percent solids latex of a polymer of 60 weight percent styrene and 40 weight percent butadiene, 28.4 parts by weight of a wet cake of expandable microspheres, the cake containing 70.4 weight percent microspheres, the microspheres being polymethyl methacrylate and containing 35 weight percent neopentane based on the combined weight of the neopentane and the methyl methacrylate and 19.6 parts by weight of water. The formulation is coated on a 51 pound bleached sulfite paper employing a No. 14 wire wound rod. The coating is subsequently air dried and foamed in a platen press in accordance with the procedure of Example 1. A smooth uniform coating is obtained with no visible defects.

EXAMPLE 15

A 51 pound bleached sulfite paper is sprayed with dry expandable microspheres by means of an electrostatic spray gun to provide a coating. The micorspheres have a shell obtained by the polymerization of 80 weight percent styrene and 20 weight percent acrylontrile and contain 35 percent neopentane based on the total weight of the neopentane. Forcing the dry expandable microspheres through the electrostatic spray gun with air results in a coating weight of 2.7 pounds per TAPPI ream. Calendering of the coated surface by means of hot polishing rolls at a temperature of about 150° C. results in a smooth continuous surface with no visible defects.

In a manner similar to the foregoing illustrations, a wide variety of substrates are readily coated and treated to provide a smooth uniform coating thereon employing a minimum of material.

The invention is particularly advantageous when employed with a compressible substrate such as paper and paperboard and other sheet-like fibrous cellulosic sheets which can be made smooth and printable without significant loss of thickness and very little gain in weight.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for providing a smooth surface on a fibrous substrate having a thickness and a visually perceptible roughness, the surface defining voids, the steps of the method comprising applying and adhering to a rough surface of the substrate a coating of synthetic resinous thermoplastic expandable particles having a diameter of from about one to about 100 microns, the quantity being sufficient to fill the voids on heat forming, heat forming and expanding the particles of the coating by contacting with a smooth heated surface to provide a substrate having a smoother surface, the formed and expanded particles being hollow and gas containing, the coating of expanded particles being of a quantity that it does not add significantly to the thickness of the substrate.

2. The method of claim 1 wherein the synthetic resinous thermoplastic particles have encapsulated therein a distinct and separate phase of an expanding agent.

3. The method of claim 2 wherein the thermoplastic resinous particles are adhered by means of a thermoplastic resinous binder.

4. The method of claim 3 wherein the thermoplastic resinous binder is a film-forming latex.

5. The method of claim 1 wherein the particles are adhered by a synthetic resinous binder.

6. The method of claim 1 wherein the substrate is paper.

7. The method of claim 1 wherein the substrate is paperboard.

8. The method of claim 1 wherein the substrate is burlap.

9. The method of claim 1 wherein the substrate is a fabric.

10. The method of claim 1 wherein the substrate is wood.

11. The method of claim 1 including the step of determining the void volume of the rough surface and subsequently adding a quantity of material sufficient to fill the voids in the rough surface.

12. A coated substrate of a fibrous nature having at least one surface, the surface of the substrate defining a plurality of depressions, the depressions of the substrate being filled with a plurality of hollow synthetic resinous microspheres, the microspheres being adhered to the surface of the article and to each other and the coated substrate having a visually smooth surface and the coating being of a quantity that it does not add significantly to the thickness of the substrate.

13. The coated substrate of claim 12 including a synthetic resinous binder adhering the microspheres to each other and to the surface of the substrate.

14. The coated substrate of claim 12 wherein the substrate is wood.

15. The coated substrate of claim 12 wherein the substrate is a fabric.

16. The coated substrate of claim 12 wherein the substrate is paper.

17. The coated substrate of claim 12 wherein the hollow synthetic resinous thermoplastic microspheres are generally monocellular.

18. The coated substrate of claim 12 wherein the substrate is paperboard.

References Cited

UNITED STATES PATENTS

| | | | |
|---|---|---|---|
| 2,755,197 | 7/1956 | Estel | 117—64 X |
| 2,827,727 | 3/1958 | Lipsius | 117—21 |
| 3,011,903 | 12/1961 | Clock et al. | 117—21 X |
| 3,067,469 | 12/1962 | Yarrison | 117—21 X |
| 3,090,695 | 5/1963 | Otto | 117—64 X |
| 3,116,349 | 12/1963 | Immel | 117—21 X |
| 3,212,915 | 10/1965 | Hackett et al. | 117—21 |
| 3,217,070 | 11/1965 | Steward | 260—2.5 X |
| 3,293,114 | 12/1966 | Kenaga | 260—2.5 X |
| 3,307,993 | 3/1967 | Gottwald et al. | 117—64 X |
| 3,338,736 | 8/1967 | Hah | 117—65.2 X |

WILLIAM D. MARTIN, Primary Examiner

P. ATTAGUILE, Assistant Examiner

U.S. Cl. X.R.

117—33, 65.2, 126, 143, 148, 155; 260—2.5